May 28, 1957  A. L. MATHEWS  2,793,553
FIELD LATHE FOR SHAPING CONDUIT ENDS
Filed Nov. 18, 1952  2 Sheets-Sheet 2
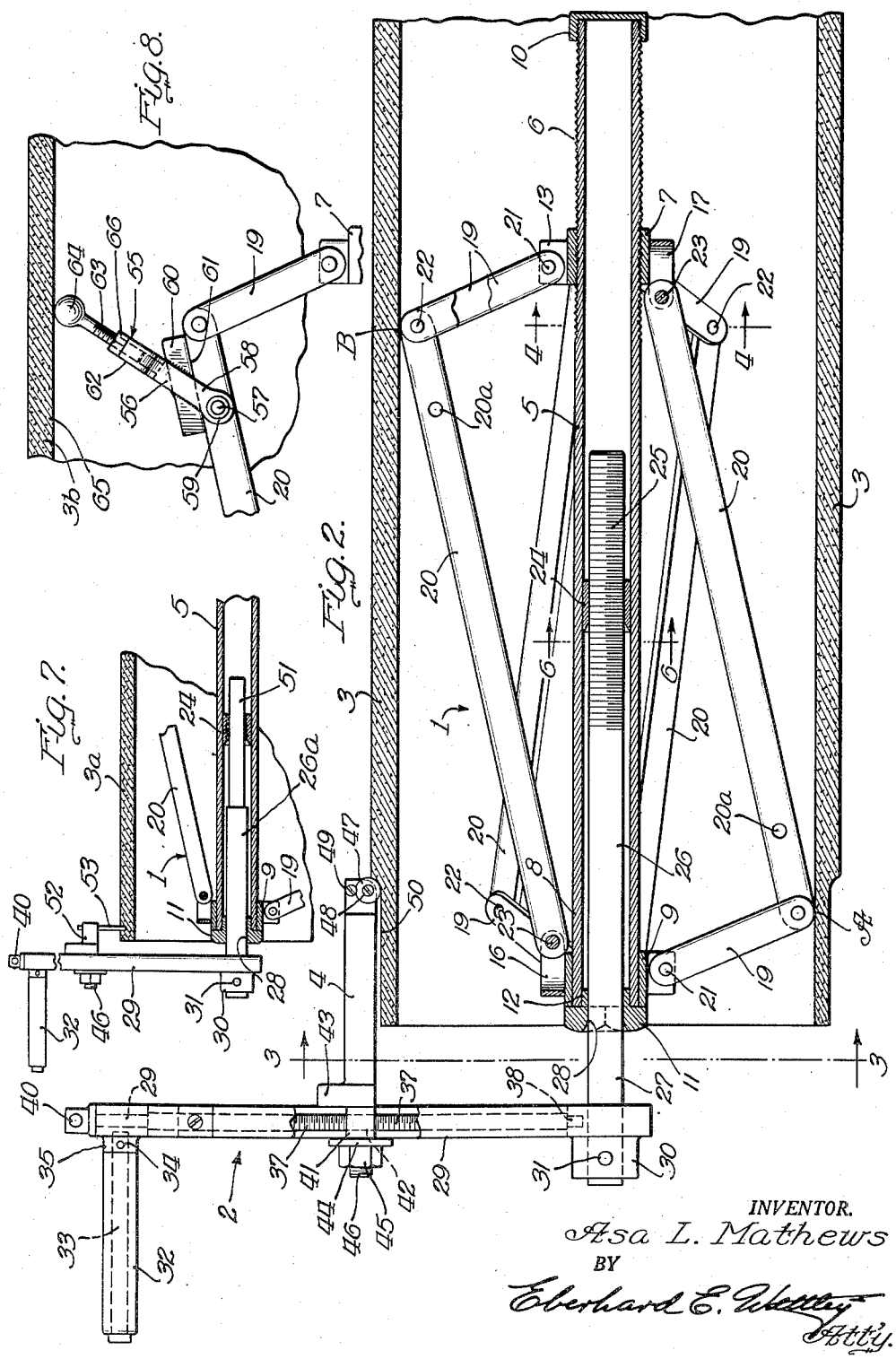
INVENTOR.
Asa L. Mathews
BY
Eberhard E. Welley
Atty.

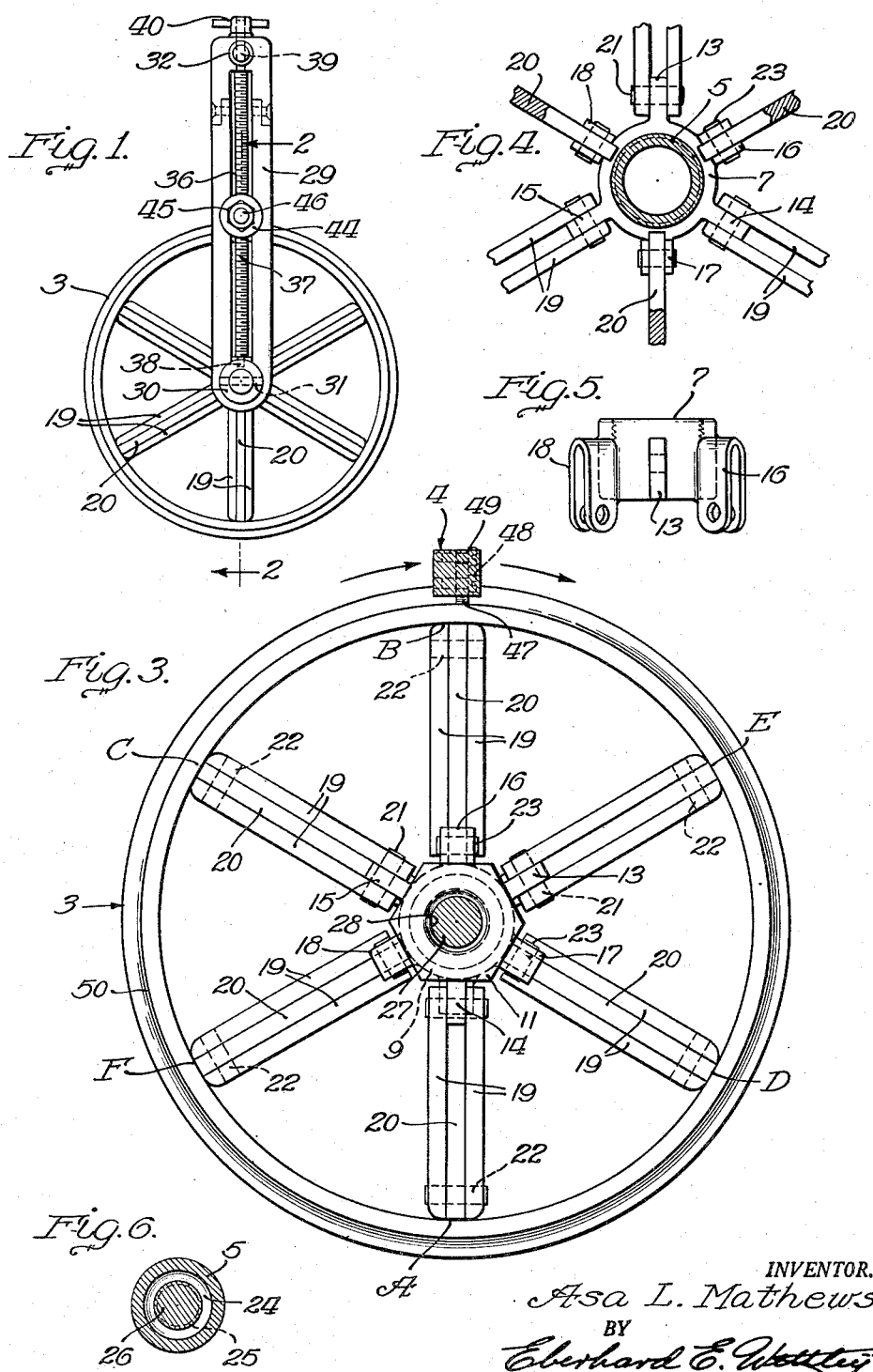

United States Patent Office 2,793,553
Patented May 28, 1957

2,793,553
FIELD LATHE FOR SHAPING CONDUIT ENDS

Asa L. Mathews, Williamsfield, Ill.

Application November 18, 1952, Serial No. 321,093

7 Claims. (Cl. 82—4)

This invention relates to a portable field lathe adapted for manual operation and for trimming, cutting and otherwise forming or shaping pipe or tube ends used in various phases of construction projects while said lathe is self-supported and oriented in a given relation with respect to said pipe or tube.

More specifically the present invention is directed to an expandible arbor mechanism which automatically centers itself within a tube or pipe and provides a means for supporting a suitably arranged cutting tool that is manually operable to shape or cut the associated pipe according to the requirements of the construction work at hand.

It is one of the main objects, therefore, of the present invention to provide an expandible arbor arrangement that is automatically self-centering and which provides a means for rotatably supporting a cutting arrangement on the axial center line of the pipe or tube.

Another object of the present invention is to provide such an arbor wherein the expandible units are peripherally spaced about the arbor for contact at annular internal points of the pipe or tube and wherein the points of contact are staggered circumferentially as well as in fore and aft relationship with respect to the pipe or tube.

Another object of the present invention is to provide such an arbor which will accommodate itself to various pipe sizes within a given diameter range in supporting the cutting tool for manual operation.

Another object of the present invention is to provide an arbor with suitable means for attachment of extension parts to each of the expandible members of the arbor whereby the range of use of the field lathe can be extended to pipes or tubes of greater diameter over and above the maximum use of the tool to pipes of a given diameter without the use of extension parts.

A still further object of this invention is to provide a tool of this construction wherein the mandrel or arbor for centering the supporting means for a tool carrier is provided with cooperative mechanism whereby it is possible to feed the tool carrier longitudinally of the arbor and pipe during manual rotation of the tool carrier.

A further object of the present invention is to provide such feed means in a housed location to protect the particular tool advancing mechanism from exposure to dirt, abrasive material, and other foreign matter which would tend to wear such cooperative parts used in feeding the tool longitudinally of the pipe.

A further object of this invention is to provide an arbor sleeve that can also be adapted for supporting a tool carrying member which does not have lengthwise actuation relatively to the arbor and pipe and which may carry a suitable cutter for trimming the end of a pipe at a definite point. Both of the tool structures carried by the mandrel or arbor of the present invention have suitable radial feed means for carrying any one of a number of cutting units toward and away from the axial center of the pipe.

Other objects and advantages relating to the field lathe of the present design and construction shall hereinafter appear in the following detailed description thereof relating to the accompanying drawings forming a part of this specification.

In the drawings:

Fig. 1 is an end view of the field lathe as the same would appear when connected with the end of a pipe to perform a cutting or shaping operation upon such pipe;

Fig. 2 is a fragmentary longitudinal section of one end of the pipe taken substantially along the line 2—2 in Fig. 1 to show further details of the construction of the field lathe;

Fig. 3 is a transverse cross sectional view taken substantially along the line 3—3 in Fig. 2 and looking in the direction of the arrows to illustrate further details of construction of the field lathe;

Fig. 4 is another fragmentary transverse cross sectional view taken substantially along the line 4—4 in Fig. 2 to illustrate further details of the arbor or mandrel of the field lathe;

Fig. 5 is a plan or side elevational view of one of the elements of the expandible toggle link mandrel or arbor;

Fig. 6 is a transverse cross sectional view taken substantially along the line 6—6 in Fig. 2;

Fig. 7 is a fragmentary detail sectional view illustrating the use of a different type of cutting tool carrier associated with the expandible mandrel or arbor; and Fig. 8 is a fragmentary view of a portion of the arbor similar to that shown in Fig. 2 but with an extension part attachment connected with the expandible mandrel to accommodate the latter to larger pipe sizes over and above that shown in Fig. 2.

It is obvious that a tool carrying arrangement or field lathe of the present construction may be adapted to pipes, tubes or conduits of various kinds of material. The present tool, however, is more specifically used in shaping, trimming or otherwise cutting the ends of pipes constructed from composite material and as one example are known to the trade as "Transite" pipe. In cutting such materials of the latter pipe construction which pipes are made from a composition of cement, asbestos or other analogous ingredients, considerable dust and dirt is present and created at the site of the use of the field lathe. It is essential that most of the parts are rugged and well constructed and as in the present design the cooperative means for advancing the tool carrying structure relative to the arbor and pipe is protected from such dust, dirt and other foreign material while the tool is in use. Furthermore, pipes of this construction while conforming with certain strength requirements do have a limited tensilt strength. For that reason, the present field lathe is constructed to distribute the internal supporting stresses created in a conduit by the lathe in a given relationship along a given length of pipe in order to avoid accidental splitting or damage to the pipe ends.

Referring now to Figs. 1 and 2, the field lathe of the present construction comprises a mandrel mechanism 1 and a tool carrying mechanism 2 with the mandrel or arbor providing a supporting structure that is axially positioned within the end of a pipe 3 to shape or work upon the end of the pipe by means of a suitable tool 4. The arbor or mandrel 1 consists of a sleeve 5 having a threaded end 6 for receiving an internally threaded sleeve bracket 7 at the threaded end of the pipe and with the non-threaded end 8 of the sleeve carrying a smooth bore sleeve bracket 9 in spaced relation to the threaded sleeve bracket 7. A threaded cap 10 closes one end of the sleeve while the other end of the sleeve receives a nut 11 having a sleeve extension 12 secured within the sleeve 5 to fix the nut 11 to the sleeve 5.

Each of the sleeve brackets is peripherally provided with three lugs or ears 13, 14 and 15 as best shown in Figs. 2 and 4, which ears are spaced at 120° angularly with respect to the axis of the sleeve 5. Each of the brackets also carries three U-shaped clips such as 16, 17 and 18 as best shown in Figs. 4 and 5 which are angularly spaced in 60° relationship about the brackets and with respect to the lugs or ears previously described with each of the clips being at 120° relationship angularly with respect to each other.

It should also be noted that the threaded sleeve bracket 7 has the ears thereon aligned with the clips of the sleeve bracket 9 as is best illustrated in Fig. 2. The two sleeve brackets can be constructed as identical elements except that the bracket 7 is threaded to receive the threaded end 6 of the sleeve 5, while the sleeve bracket 9 can be bored out to a larger internal diameter to ride upon the outer circumference of the other end 8 of the sleeve 5.

A plurality of toggle link structures are connected between the two sleeve brackets and each toggle link structure consists of a pair of short links 19 and a relatively long single link 20. Each pair of short links 19 are carried upon a pivot pin 21 supported by a lug or ear such as 13 on the sleeve bracket 7 with the links straddling the ear. The outer ends of the pair of short links 19 are pivotally carried upon a pin 22 connected with the adjacent end of the long link 20 with both of the short links straddling such link at this position. The other end of the long link 20 is cradled or sandwiched between the ears of one of the clips such as 16 shown in Fig. 2 and carried upon a pivot pin 23 supported by the ear ends of the clip 16.

With this particular arrangement of toggle link structure through the use of the double links 19 at one end and the single link structure being secured between a double clip at the other end, lateral stability is introduced into this link arrangement whereby such links are maintained in a true axial position with respect to the sleeve 5 during the relative pivotal movements of the links.

Each of the link mechanisms are expanded or contracted axially with respect to the sleeve 5 by relative movement of the two sleeve brackets 7 and 9. Such relative movement is accomplished by turning the nut 11 with a suitable wrench or other tool whereby the threaded sleeve bracket 7 is moved along the threaded end 6 of the sleeve while the other bracket 9 may be suitably positioned along the outer surface of the sleeve and preferably against the inner shoulder portion of the nut 11. The sleeve bracket 9 will normally be held in this position along the nut 11 whenever the sleeve bracket 7 is moved toward bracket 9 which expands the link mechanisms for engaging the internal surface of the pipe 3. In threading the sleeve bracket 7 in the opposite direction, sleeve bracket 9 may be frictionally retained in the positioned shown or else it may move a certain amount along the sleeve permitting hand collapse radially inwardly of the link mechanisms as the sleeve bracket 7 is moved toward the outer end of the sleeve 5.

An annular nut 24 is welded or otherwise secured within the hollow interior of the sleeve 5 as best illustrated in Figs. 2 and 6 for the reception of a threaded end 25 of a shaft 26 of the tool carrier 2. The non-threaded end 27 of the shaft 26 is slidably carried within the internal bore 28 of the nut 11 while the threaded end 25 is suitably axially supported by the annular sleeve nut 24 within the sleeve 5.

As best shown in Figs. 1 and 2, the tool carrier 2 includes a crank arm 29 having a hub 30 which is secured to the shaft 26 by means of a pin or screw 31. A rotatable handle 32 is carried upon the stem 33 that is secured by means of a pin 34 to the boss 35 carried at the outer end of the crank arm 29. This crank arm 29 has a central slot 36 within which is pivotally carried a screw 37 having a spindle 38 located adjacent the hub 30 and a shaft end 39 which passes through the top portion of the crank handle 29 to be connected with a hand screw 40.

As shown in Fig. 2, a tool carrier 4 has a square extension 41 that is threaded as at 42 for receiving the screw 37 therethrough and the tool carrier 4 is held at right angles to the handle 29 by means of the base 43 which abuts one side of the crank 29 while a stabilizing washer 44 is held in engagement with the opposite side of the crank 29 by means of the nut 45 that is threaded upon the stub end 46 of the extension 41. Thus the hand screw 40 actuates the screw 37 to move the tool holder 4 axially with respect to the shaft 26 and obviously in relation to the mandrel or arbor as well as the pipe with which such arbor is connected.

The tool carrier 4 may be provided with any suitable type of cutting member to perform a given operation of shaping or cutting the pipe. In Fig. 2 a circular cutter 47 is connected by means of screw 48 and 49 to the end of the tool bar 4 for the purpose of cutting away a portion of the outer surface of the pipe 3 down to a size such as indicated at 50 for tenoning or for other purposes.

With the cooperative means comprising the threaded sleeve nut 24 carried by the sleeve 5 and the threaded end 25 of the tool carrying shaft 26, it is possible to feed the cutting member 47 longitudinally of the pipe 3 while the handle 32 is being manually rotated about the axial center of the sleeve 5 by means of the supporting pivot shaft 26 as explained.

Whenever a tool carrier is being employed which does not need the relative feed arrangement comprising the sleeve nut 24 and threaded shaft 26, an arrangement may be used as best illustrated in Fig. 7. In this case, the shaft 26a is provided with a reduced end 51 that is guided through the threaded interior of the sleeve nut 24 while the outer end of the shaft 26a is supported as before by means of the bore 28 within a nut 11. The crank 29 and its handle 32 and other constructional members are the same as in the form described in connection with Fig. 2. Shafts 26 and 26a are interchangeable in use with the crank arm 29.

In the Fig. 7 arrangement, however, a different cutting tool support 52 is employed which carries a cutter 53 which can be axially fed with respect to the pipe 3a in order to cut off an end piece such as 54 from the pipe. By positioning the cutter 53 in a given position longitudinally of the pipe 3a and making a cut about the end of the pipe, this entire tool carrying support including the shaft 26a will be maintained in the position shown since the cutter 53 will thereafter be guided within the initial peripheral cut during the manipulation of the handle 32 and the feeding of the screw by means of the hand screw 40.

Other forms of tool carriers or cutters may be employed for shaping the end of the pipe 3, and such cutters and tool arrangements are more fully described and illustrated in my copending application Serial No. 321,094 filed of even date herewith.

The previous explanation was directed to a preferred construction of field lathe substantially as illustrated in Figs. 1 to 6 inclusive. As shown in Fig. 2, the maximum expansion of the mandrel or arbor 1 can be used to approximately service a pipe of the diameter shown in Fig. 2. Other pipes of smaller diameter may be serviced by this same tool, the minimum limits and diameter being determined by the maximum collapse of the field lathe arbor.

However, if larger pipes are to be serviced than that shown in Fig. 2, it is possible to use the extension part illustrated in Fig. 8. Each of the long links 20 is provided with an opening or hole 20a to receive the extension part or bracket shown substantially at 55 in Fig. 8. This extension part comprises a clevis 56 which straddles the link 20 and a suitable bolt 57 passes through the spaced legs of the clevis 56 and through the opening 20a to be secured in place by means of the nut 59. A bar or block 60 is welded or otherwise secured within the opening between the legs 58 of the clevis 56 and is positioned as shown in angular relation to the longitudinal axis of the extension part 55 so as to rest in abutting relation at 61 upon the top edge of the link 20. This firmly fixes the position of the extension part 55 in relation to the link 20 since the only possible movement of the bracket or extension 55 would be counterclockwise while in use and as shown in Fig. 8. The solid end 62 of the clevis 56 is threaded to receive the threaded end of a shank 63 that carries a ball 64 at the terminal end thereof for engaging the interior surface 65 of the large diameter pipe 3b. A nut 66 secures the threaded shank 63 to the clevis 56. With this particular bracket or extension part 55 it is possible to adjust the distance of the ball 64 with respect to the position of the bolt 57 to provide for equal contact of the bracket units individually about the internal periphery of the pipe 3b. The screw arrangement of the bracket allows for further adjustment if that is desirable. Obviously, if these units are once set they can be used in that position without further adjustment.

It should also be noted that the particular arrangement of expandable mandrel or arbor provides the link mechanisms which make point contacts at points A and B as illustrated in Fig. 2. These points are located in the same plane with each set of expandable toggle links, but these points are also spaced considerably longitudinally with respect to each other along the length of the pipe. With the next pair of links that are positioned at 60° relationship with respect to the next adjacent pairs of links the point contacts of the pipe interior will be alternated so that as best shown in Fig. 3 the forward point of contact will be at C while the rearward point of the same link in the same plane will be at D and as shown in Fig. 3, the third pair of links will have their forward contact point at E and their rear contact point at F.

This provides in effect three planes of operation wherein the points of contact are staggered longitudinally of the pipe while each set of three transverse points of contact of the various link mechanisms are equi-distant and spaced at 120° intervals to provide an effective but ideal distribution of the stress points within the end of the pipe for centering the expandable arbor or mandrel with a minimum strain upon such pipe. Furthermore, with the three point support at each end of the mandrel structure shown irregularities of the pipe and its interior will be well compensated and the tool will at all times be definitely centered fore and aft upon the pipe axis, which centering will be automatically produced by the turning of the mandrel or arbor expansion nut 11.

The description and disclosure of the present invention relates to a preferred construction thereof. However, certain changes are contemplated in the combination of the parts and in the parts themselves without departing from the fundamental concept of the present invention. Such modifications shall, however, be governed by the breadth and scope of the appended claim or claims relating to the field lathe of the present invention.

What I claim is:

1. A field lathe for shaping conduit ends comprising an expandible arbor mechanism releasibly securable within the interior of said pipe, and a tool carrying unit supported by said arbor mechanism for rotation about said conduit, said expandible arbor mechanism comprising a support at the axis of said conduit for said tool carrying unit, toggle link means connected with said support for pivotal movement toward and away from said support and radially with respect to said conduit axis for contact with the interior surface of the conduit, said links of each toggle link means comprising a pair of pivotally connected link members, one link member being long and the other link member being short to establish a radially disposed conduit engaging joint between said members near one end portion of said arbor mechanism, each of said toggle link means being arranged with their long and short link members in reversed positions end for end with respect to their next adjacent toggle link members and in respect to said arbor mechanism whereby the joints of said connected link members are adapted for alternate opposite radially staggered contact at longitudinally spaced points about the interior periphery of said conduit.

2. An expandible self centering arbor device for rotatably supporting a conduit shaping cutting tool mechanism comprising a support for said tool mechanism and centering means connected with said support to position the latter axially with respect to said conduit, said centering means comprising a pair of relatively movable brackets spaced along said support, toggle link sets connected between said brackets, each link set having directly connected long and short links to engage the conduit surface at their intermediate pivotal toggle point of connection, said link sets being angularly spaced about said support, and said adjacent link sets having their long and short links reversed end to end with respect to said support to longitudinally and radially stagger the toggle points of contact of each link set with the interior circumferential surface of said conduit.

3. An expandible self centering arbor device for rotatably supporting a conduit shaping cutting tool mechanism comprising a support for said tool mechanism and centering means connected with said support to position the latter axially with respect to said conduit, said centering means comprising a pair of relatively movable brackets spaced along said support, toggle link sets connected between said brackets, each link set having long and short links to engage the conduit surface at their intermediate pivotal toggle point of connection, said link sets being angularly spaced about said support, and said adjacent link sets having their long and short links reversed end to end with respect to said support to longitudinally stagger the toggle points of contacts of each link set with the interior surface of said conduit, said link sets being arranged in pairs at diametrically opposite positions with respect to said support with the toggle point of conduit contact of one such diametrically positioned set being longitudinally staggered with respect to the toggle point of conduit contact of the other of said diametrically positioned set.

4. An expandible self centering arbor device for rotatably supporting a conduit shaping cutting tool mechanism comprising a support for said tool mechanism and centering means connected with said support to position the latter axially with respect to said conduit, said centering means comprising a pair of relatively movable brackets spaced along said support, toggle link sets connected between said brackets, each link set having directly connected long and short links to engage the conduit surface at their intermediate pivotal toggle point of connection, said link sets being angularly spaced about said support, and said adjacent link sets having their long and short links reversed end to end with respect to said support to longitudinally and radially stagger the toggle points of contact of each link set with the interior circumferential surface of said conduit, and cooperative actuating structure connected with said brackets and said support to cause relative longitudinal movement between said brackets to expand said toggle link sets radially outwardly with respect to said support and into holding engagement with the internal surface of said conduit.

5. In a field lathe for shaping conduits, a tool carrying arbor, link assemblies having articulate links carried by said arbor including operable means to actuate said articulate links radially with respect to said arbor to actuate said links into engagement with the interior surface of a conduit and to center said arbor in said conduit, and extension units releasibly connectible with one of said links of each of said assemblies respectively to provide further means to center said arbor in conduits of greater internal diameter than normally serviceable by said link assemblies per se, said extension units each comprising an elongated member fixedly connected in a given angular relation with respect to one of said articulate links of said link assemblies, and a circular conduit abutment unit carried upon the end portion of each of said elongated members.

6. In a field lathe for shaping conduits, a tool carrying arbor, link assemblies carried by said arbor including operable means to actuate said link assemblies radially with respect to said arbor to engage the interior surface of a conduit and to center said arbor in said conduit, and extension units releasibly connectible with said link assemblies respectively to provide further means to center said arbor in conduits of greater internal diameter than normally serviceable by said link assemblies per se, said extension units each comprising a clevis to straddle one link of each link assembly respectively, abutting means to contact said one link to position said clevis in a given operable conduit contacting relation with respect to said one link, and a conduit contacting head adjustably connected with said clevis.

7. A conduit tenoning mechanism comprising a tubular positioning means to support a cutting tool arbor therein in a given relation with respect to the axis of a conduit, and a multiple link structure connected with said tubular positioning means and arranged for internal surface contact with the conduit comprising a pair of relatively movable members operable in the direction of the axis of the conduit, one of said relatively movable members being carried in fixed relation upon said tubular positioning means, said tubular positioning means including a threaded section, and the other of said relatively movable members being threaded and adapted for coaction with said threaded section of said tubular positioning means, and a plurality of pairs of pivotally connected links having their free ends pivotally connected with said relatively movable members respectively to be actuated by said members, said pairs of links each comprising connected long and short links with every other set connected in reversed order longitudinally of said conduit and between said members, said link sets providing expandible mechanism rendered operative under relative actuation of said members to cause said link sets to spot contact the interior of the conduit in both longitudinal and circumferential staggered relation for orienting and fixedly supporting said arbor positioning means within said conduit.

References Cited in the file of this patent
UNITED STATES PATENTS

| | | |
|---|---|---|
| 497,105 | Vale | May 9, 1893 |
| 567,658 | Rose | Sept. 15, 1896 |
| 938,058 | Johnston | Oct. 26, 1909 |
| 1,099,215 | Sullivan | June 9, 1914 |
| 1,155,337 | Burns | Oct. 5, 1915 |
| 1,691,045 | Burke | Nov. 13, 1928 |
| 1,823,959 | Steinmayer | Sept. 22, 1931 |
| 2,537,916 | Rosenboom | Jan. 9, 1951 |
| 2,607,376 | Montgomery | Aug. 19, 1952 |